Dec. 1, 1953
E. P. MORSE ET AL
2,660,909
PIVOTED SHEET METAL FLANGING HAND TOOL
Filed Jan. 5, 1950
2 Sheets-Sheet 1
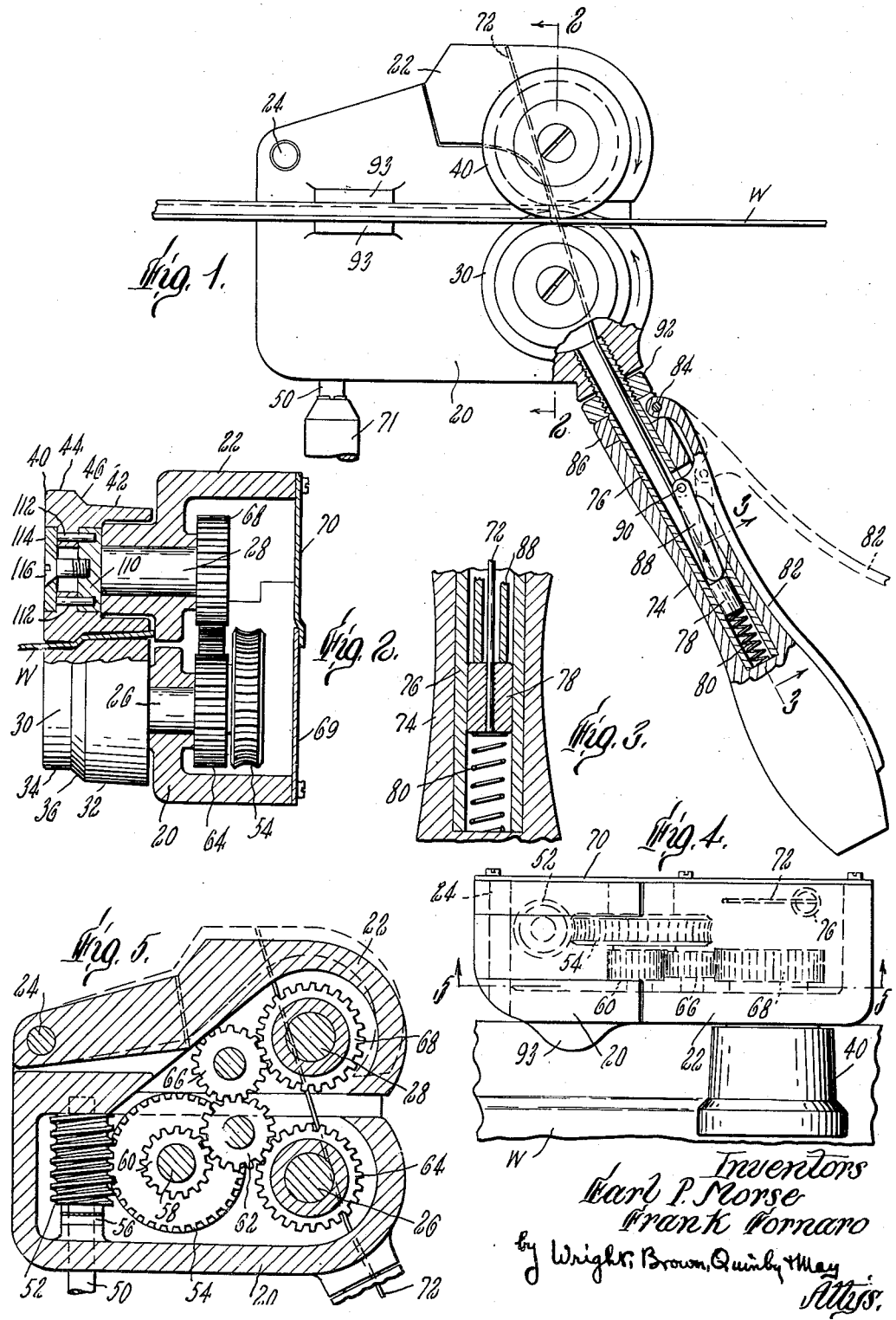

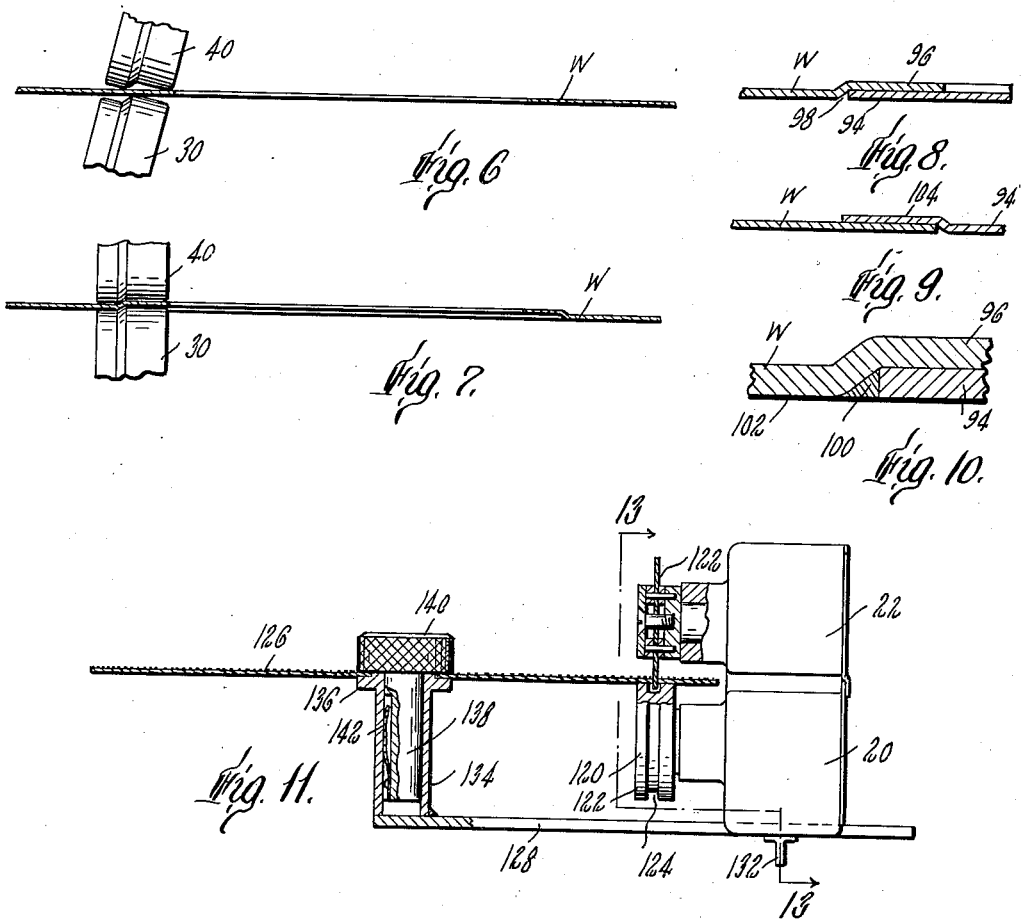

Patented Dec. 1, 1953

2,660,909

UNITED STATES PATENT OFFICE 2,660,909

PIVOTED SHEET METAL FLANGING HAND TOOL

Earl P. Morse, Wollaston, and Frank Fornaro, North Quincy, Mass.

Application January 5, 1950, Serial No. 136,876

2 Claims. (Cl. 81—15)

This invention relates to a process for repairing damaged metal objects such as automobile bodies or the like. Owing to a number of reasons including congested automobile traffic, careless driving, and slippery road surfaces, collisions of automobiles with other automobiles or objects are frequent, such collisions usually resulting in more or less damage to a mudguard or other portion of the body. Dents can usually be straightened by the use of suitable tools, but if the metal is torn or is badly twisted or crumpled, it may be necessary to cut out the damaged part and replace it with a panel or patch to restore the original shape. According to the present invention a portable tool has been developed by which repairs of this kind can be made with excellent results and with a substantial saving of time and labor. When the damaged portion of a sheet metal object has been cut away, a panel or patch of similar shape but larger size is prepared to cover the hole left by the cut-away portion and to make a lap-joint with the marginal portion of the object surrounding the hole. Before the panel is applied to the object, either the margin around the hole or the margin of the panel itself is operated on to offset such margin by a distance equal to the thickness of the sheet metal of which the object and the patch are made, this operation being known as "joggling." Hence, if the margin around the hole is offset inward, the step thus formed will receive the margin of the panel which will then be flush with the adjacent portions of the object. The panel can then be tack-welded in place, the crack between the edge of the panel and the bend at the offset being filled with a suitable crack filler such as melted lead and the whole surface being covered with a coat of paint, enamel or the like. Instead of offsetting the margin of the hole, the margin of the panel may be offset or "joggled." When the panel is inserted in the hole from behind the object, the portion of its front face which fits in the hole will be flush with the margin surfaces surrounding the hole. The panel can then be tack-welded in place and the finishing steps be taken as hereinbefore described. This method of making lapped joints between the body member and the patch and tack-welding the patch in place offers several advantages over the usual process of butt-welding a patch in a hole. The latter process involves the use of asbestos packs, is liable to result in distortion and buckling of the patch from the heat of the welding operation and often necessitates the removal of upholstery from the vicinity of the repair to avoid excessive fire hazard.

The metal sheet stock of which automobile body parts are usually made is too stiff and rigid to permit satisfactory shaping by some manually operated tools which can be used on thinner sheet metal.

In order to make possible a smooth patching job on automobile bodies, especially where semi-skilled operators may have to be employed a special power-driven tool has been devised, according to the invention, for quickly and evenly offsetting the margin of the hole or the patch to provide the step by which the patch can be supported in a flush position. This tool is portable so that it can be readily applied to automobile body parts without requiring removal of the part from the automobile.

The tool is also designed for a different but related use. In repairing automobile bodies which have been damaged, a great deal of final smoothing must be done after dents and the like have been removed. For this purpose abrasive discs are widely used, these discs being of molded plastic with abrasive material on a face thereof. The discs are usually thin and have a diameter of several inches. When in use, only the outer inch or half-inch is actually applied to the work. Hence, when the abrasive material is worn off the peripheral annulus of the disc, the inner portion is as good as new. According to the invention, the tool hereinafter described can be adapted to break off the worn margins of the disc and thus render it ready for additional use with a reduced diameter. This can be repeated until the diameter gets too small for further practical use.

For a more complete understanding of the invention, reference may be had to the following description thereof and to the drawings, of which—

Figure 1 is an elevational view of a tool embodying the invention, a portion being broken away to show in section;

Figure 2 is a sectional view on the line 2—2 of Figure 1;

Figure 3 is a sectional view on the line 3—3 of Figure 1;

Figure 4 is a top plan view of the tool shown in Figure 1;

Figure 5 is a sectional view on the line 5—5 of Figure 4;

Figure 6 is a fragmentary elevational view of the rollers of the tool separated to receive the margin of a sheet metal object shown in section;

Figure 7 is a view similar to Figure 6 but showing the rollers after they have been moved together to press the margin of the sheet;

Figure 8 is a fragmentary sectional view on an enlarged scale of a lapped joint between a patch and the object to which it is applied, the margin of the hole in the object being offset to receive the patch;

Figure 9 is a fragmentary sectional view of a lapped joint between the object and the patch, the margin of the patch being offset to receive the margin of the object;

Figure 10 is a fragmentary sectional view on a larger scale showing a completed lapped joint which has been finished to provide a smooth continuous surface;

Figure 11 is an elevational view of the tool modified to serve a different purpose;

Figure 12 is a bottom plan view of the apparatus shown in Figure 11; and

Figure 13 is a fragmentary sectional view on the line 13—13 of Figure 11.

A portable tool for offsetting the margin of a sheet metal object is shown in Figure 1. This tool comprises a body or frame having a main portion 20 and a rockable portion 22 pivotally attached to the main portion so as to rock about a pivot 24. A pair of parallel shafts 26 and 28 are journalled respectively in the main portion 20 and the rockable portion 22 of the frame. The shaft 26 carries on its outer end which projects from the frame 20 a roller 30 which has two approximately cylindrical portions 32 and 34 of different diameter connected by a frusto-conical portion 36, the difference between the radii of the portions 32 and 34 being approximately equal to the thickness of the metal sheet to be operated upon. On the outer projecting end of the shaft 28 is mounted a roller 40 which is complemental in profile to the roller 30. The roller 40 has two approximately cylindrical portions 42 and 44 connected by a frusto-conical portion 46. The portions 32 and 42 of the two rollers are adjacent to the base of the rollers and are axially longer than the portions 34 and 44. Since the profiles of the rollers are complemental, the cylindrical portion 32 of the roller 30 which is of greater diameter than the cylindrical portion 34 of the same roller is tangent to the cylindrical portion 42 of the roller 40 which is of less diameter than the cylindrical portion 44 of the same roller, the cylindrical portions 34 and 44 likewise being tangent to each other when the rollers are touching. As indicated in Figure 2, the portions 32 and 42 of the rollers taper slightly to ensure that the offset margin is parallel to the adjacent portion of the object, these shapes of the rollers being empirically determined. Since the sheet metal customarily employed for automobile bodies and mudguards is somewhat stiff and rigid so as to be difficult to work by hand-operated tools, provision is made for rotating the rollers 30 and 40 by power means. To this end, as indicated in Figure 5, a power input shaft 50 is journalled in the frame member 20 and projects therefrom in a plane perpendicular to the axis of the roller shafts. The power shaft 50 carries a worm 52 which meshes with a worm gear 54 mounted in the frame member 20. A suitable thrust bearing 56 is on the shaft 50 to take the axial reaction of the worm drive. The gear wheel 54 is mounted on a shaft 58 to rotate with a pinion 60 mounted on the same shaft. The pinion 60 meshes with another pinion 62 which in turn meshes with a gear wheel 64 and a third pinion 66, all of this gearing being carried by the frame member 20. The gear wheel 64 is mounted on and secured to the shaft 26. The pinion 66 meshes with a gear wheel 68 which is mounted on and rotates with the shaft 28. As is evident from Figure 5, rotation of the power input shaft 50 results in a simultaneous driving of the shafts 26 and 28 at a considerably reduced speed and in opposite directions. The gearing is protected by a narrow casing the front wall and edges of which are the frame members 20 and 22, the rear wall consisting of two plates 69 and 70 which are parallel to the front wall and are secured to the frame members 20 and 22 respectively and which overlap sufficiently, as shown in Figure 2, to permit the member 22 to rock on its hinge 24 without opening a gap between the rear wall plates 69 and 70. The shaft 50 may be rotated by being connected to any suitable source of power, such, for example, as a portable electric drill, the chuck 71 of which is indicated in Figure 1. Thus the entire tool with the prime mover operatively connected therewith is easily portable and can be applied to operate on margins of holes cut in body parts of automobiles while such parts remain in place. This often results in a great saving of time and labor in cases where the body part would ordinarily have to be removed from the vehicle.

In order to make possible the introduction of the margin of a sheet metal object between the rollers 30 and 40, it is necessary to separate the rollers sufficiently, as indicated in Figure 6. It is for this reason that the parts 20 and 22 of the frame are hinged as at 24 to permit movement of the axes of the rollers toward and from each other. When the margin of a sheet metal object W has been inserted between the separated rollers 30 and 40, considerable force is usually required to pull the rollers together, owing to the stiffness of the metal operated on. As indicated in Figure 1, a tension element 72, which may conveniently be a piece of piano wire, is secured at one end to the frame member 22. The tension element extends down into an axial hollow in a handle 74 which projects from the frame member 20 in a direction away from the member 22 and nearly in line with its rollers. Within the handle is a tube 76, the end of which is screw threaded or otherwise secured to the frame member 20. The lower end of the tension wire 72 is anchored in a sliding cylindrical block 78 which is in the lower portion of the tube 76 and which is pressed yieldingly upward by a suitable spring 80. In order to move the rollers 30 and 40 toward each other after the margin of an object has been inserted between them, a toggle mechanism is provided to press against the lock 78 and move it downward, thus drawing the frame member 22 down by means of the tension element 72 which is attached thereto. The toggle mechanism comprises an elongated lever 82 which is shaped to fit against the contour of the handle 74. This lever is hinged at 84 to a collar 86 at the upper end of the handle. A toggle link 88 is hinged at 90 to the lever 82. This link 88 may conveniently be in the form of a channel so as to straddle the wire 72, the lower end of the link 88 bearing against the upper end of the block 78. When the lever 82 is pressed from its outward position, shown in dotted lines in Figure 1, to its position against the handle 74, the toggle is straightened, this resulting in a strong downward thrust against the block 78 and a corresponding tension on the wire 72 which pulls the roller 40 toward the roller 30. The upward reaction is taken by a nut 92 which is adjustable on the tube 76. The mechanical advantage afforded by the toggle is sufficient to bend the margin of the sheet metal object W between the two rollers as indicated in Figure 7. By utilizing the electric motor attached to the input shaft 50 by means of a chuck 71 or the like, the rollers 30 and 40 are positively driven in opposite directions thus causing the tool to progress along the margin on which it has been mounted, such margin being thus offset from the rest of the object by a distance substantially equal to the stock thickness of the sheet.

The front wall of the frame member 20 acts as a guide or stop to limit the distance the edge of a sheet metal object can be inserted between the rollers 30 and 40 and thus regulates the width of the offset step formed on the margin of the object. This wall, however, does not extend beyond the line of centers of the rollers (that is, to the right of the line of centers as shown in Figure 1) so that the device can move into corners as it operates.

The margin of the work piece, after it has passed between the rollers and has been offset by them, is guided by a channel between two spaced ears 93 on the front wall of the frame 20.

Figure 8 shows a lapped joint between the sheet metal object W in which a hole has been cut and a patch or panel 94 which has been cut to shape to cover the hole and to overlap the margin 96 around the hole which has been offset by the rollers 30 and 40 as hereinbefore described. The patch is tack-welded to the object W to secure the patch in place and to make it permanent. The crack or seam 98 around the edge of the patch 94 may then be filled with a suitable crack filler such as molten lead 100, as indicated in Figure 10, a coat of paint or other finishing material 102 being then applied to the surface to complete the job.

Instead of offsetting the margin of the object around the hole, it may be preferred to offset the margin of the patch itself as at 104. In such case, the patch is applied to the hole from the rear of the object so that the central portion of the patch, which is relatively raised with respect to the offset margin, projects into the hole from the rear so that its front face is flush with the adjacent surface portions of the object surrounding the hole. The lapped joint is then tack-welded, the seam along the edge of the hole is filled as hereinbefore described and the surface is finished with a coat of paint or enamel to complete the job. It is to be understood that instead of tack-welding, any other suitable means for fastening the patch in place may be employed. For example, sheet metal screws, rivets, or bolts and nuts can be employed, thus making it unnecessary to remove adjacent upholstery to avoid a fire hazard. In some cases other kinds of welding or brazing may be employed. Whatever the means employed to secure the patch in place, it is usually desirable that the outside surface be finished flush.

In the tool illustrated in Figure 1, the rollers 30 and 40 can be readily removed for replacement by rollers of different size or shape which may be required for other uses. For this purpose, the shaft 28 is provided with a hub portion 110 of larger diameter which may be integral with the shaft or firmly secured thereto. A pair of pins 112 project from the hub 110 parallel with the axis and are received by holes in the roller. A washer 114 is countersunk in the outer end of the roller, this washer being provided with a central hole to receive a screw 116 which is threaded into a central bore in the end of the shaft 28. The roller 30 is secured to the shaft 26 by similar means.

Figures 11, 12, and 13 show a related use to which the apparatus can be put. The rollers 30 and 40 are replaced respectively by a grooved roller 120 and a circular blade 122 which has a serrated periphery as indicated in Figure 13. The peripheral groove 124 of the roller 120 is arranged to receive a portion of the periphery of the disc 122. The object of the roller 120 and the disc 122 is to trim from an abrasive disc an annular portion adjacent to its periphery which has become worn by use. An abrasive disc 126 is illustrated in Figure 11, such a disc customarily consisting of a molded plastic material having an abrasive face to be used in smoothing and polishing metal objects. As such discs are used in portable, motor-driven tools, the outer half-inch or inch of the abrasive face gets practically all of the use so that this portion of the disc uses up while the inner portion which it surrounds is practically unused. By trimming off the used portion after it has been worn to a point where it is no longer sufficiently effective, a new marginal area is thus obtained on a disc which has been reduced in diameter by the trimming operation. This process can be repeated until the diameter of the disc becomes too small for practical use.

In order to utilize the tool to trim off the marginal portion of the disc 126, the disc may be supported with reference to the tool by a bracket arm 128 having a slot 130 through which extends the stem 131 of a turn-button 132 which can pass through the slot and then be turned a quarter turn to hold the arm. A spring washer 133 on the stem presses the button resiliently against the arm to hold it in adjusted position. The bracket has a tubular portion 134 at the end of the arm 128, this tubular portion having a flange 136 on which the disc may rest. A plug 138 with knurled head 140 may be thrust down through the central hole of the disc and into the bore of the tubular member 134 to hold the disc in place with its margin extending over the roller 124, a leaf spring 142 being carried in a groove in the shank of the plug to hold it frictionally in place. The cutting disc 122 is then moved down by operation of the lever 82 (Figure 1) to move the edge of the disc 122 into the groove 124. This forces some of the teeth of the disc 122 through the abrasive disc 126. The roller 120 and disc 122 are then rotated through the driving shaft 50 so that the disc 122 progresses along the margin of the abrasive disc 126 and thus trims off the desired marginal portion of the abrasive disc, the action of the teeth of the cutting roller 122 being a breaking action rather than a sawing action.

We claim:

1. A portable tool for offsetting the margin of a sheet metal object, comprising a narrow casing with parallel front and rear walls, said casing having two parts pivotally joined together, a pair of parallel shafts each journalled in a respective part of the front wall and movable toward and from each other, rollers mounted on said shafts to rotate therewith, said rollers having complemental profiles, a supporting handle projecting from one of said frame parts in a direction parallel to said walls, means on said handle connected to the other said part and manually operable to draw said rollers together, a power input shaft projecting from said frame in a direction parallel to said walls, and reduction gearing carried in said casing and operatively connecting the power input shaft to said roller shafts to revolve the latter at equal speeds in opposite directions.

2. A portable tool for offsetting the margin of a sheet metal object, comprising a frame composed of two members hinged together, a roller carried by each of said members, said rollers having parallel axes and being movable toward and from each other, power connections in one of said members for driving the roller carried thereby, an elongated handle projecting from one of said members in a direction away from said other member, the axis of said handle approximately intersecting the axes of both said rollers, a tension element attached to said other member and extending into said handle, and means carried by said handle operable to pull on said tension element to draw said rollers together.

EARL P. MORSE.
FRANK FORNARO.

References Cited in the file of this patent

UNITED STATES PATENTS

| Number | Name | Date |
|---|---|---|
| 22,459 | Stow | Dec. 28, 1858 |
| 200,689 | Brombacher | Feb. 26, 1878 |
| 643,061 | Hukriede | Feb. 6, 1900 |
| 732,858 | Irland | July 7, 1903 |
| 745,665 | Reis | Dec. 1, 1903 |
| 782,004 | Chandler | Feb. 7, 1905 |
| 1,298,656 | Brinkman | Apr. 1, 1919 |
| 1,554,361 | Mattice | Sept. 22, 1925 |
| 1,602,832 | O'Brien | Oct. 12, 1926 |
| 1,774,155 | Platou | Aug. 26, 1930 |
| 2,146,949 | Flagler | Feb. 15, 1939 |
| 2,412,972 | Dean | Dec. 24, 1946 |
| 2,434,401 | Farnstrom | Jan. 13, 1948 |
| 2,502,245 | Charles | Mar. 28, 1950 |

FOREIGN PATENTS

| Number | Country | Date |
|---|---|---|
| 412,200 | France | July 6, 1910 |